May 3, 1960  P. E. R. FAUVELOT  2,935,683
METHOD AND APPARATUS FOR MEASURING A MAGNITUDE
SUCH AS A VELOCITY OF ROTATION
Filed Sept. 27, 1956  6 Sheets-Sheet 1

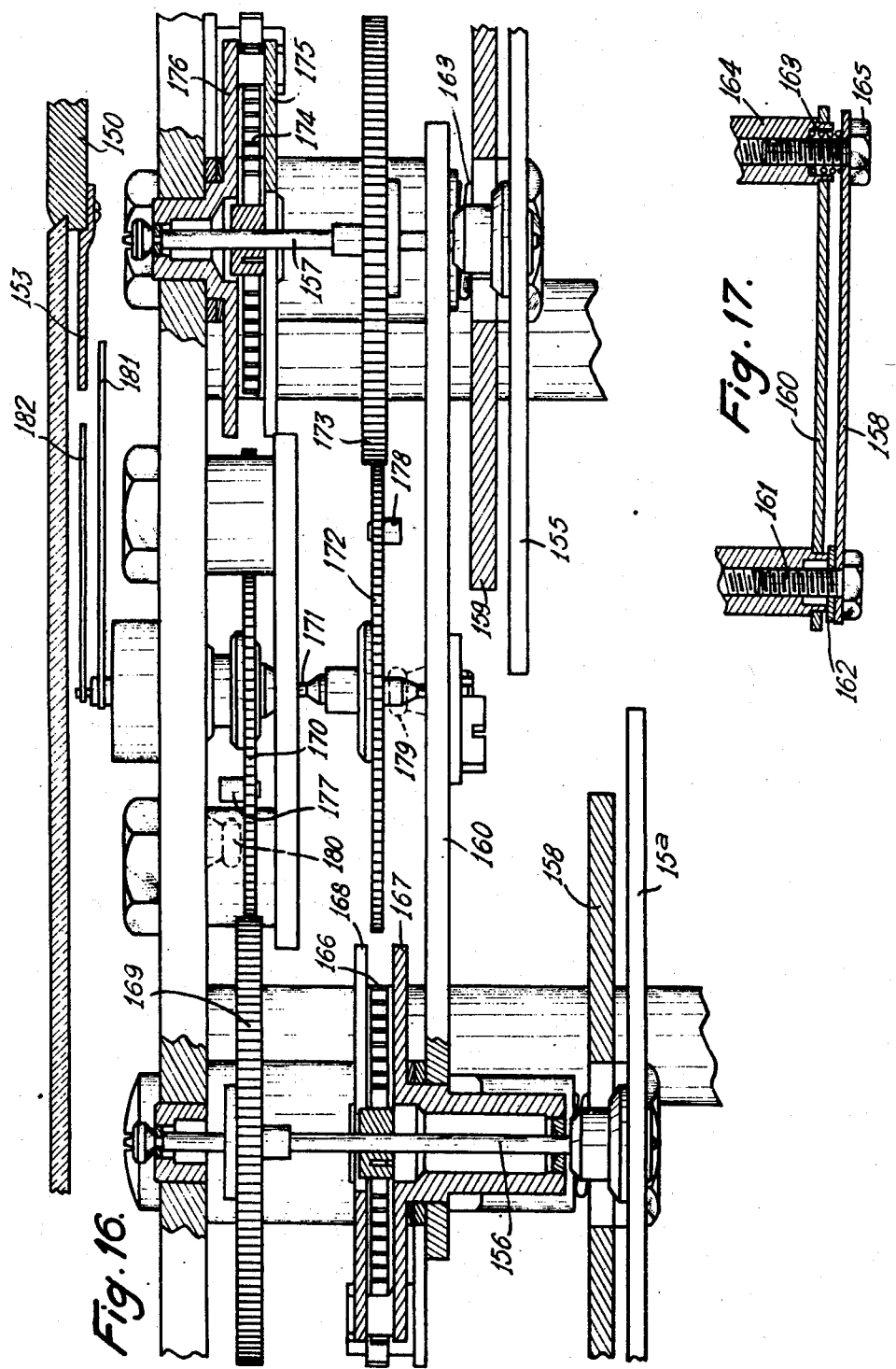

United States Patent Office 2,935,683
Patented May 3, 1960

2,935,683

METHOD AND APPARATUS FOR MEASURING A MAGNITUDE SUCH AS A VELOCITY OF ROTATION

Pierre Ernest Rene Fauvelot, Ville d'Avray, France, assignor to Societe Anonyme Etablissements Ed. Jaeger, Levallois-Perret, Seine, France Application September 27, 1956, Serial No. 612,526

Claims priority, application France October 7, 1955

20 Claims. (Cl. 324—70)

The measurement of a high or very high velocity of rotation is a problem very difficult to solve. This case is encountered in the measurement of the rotor velocities of turbo-jet engines. Conventional speed indicators with electric or even mechanical transmission means may be used for small-diameter, high-speed turbo-jet engines, but for large-diameter turbo-jet engines the lack of accuracy in speed readings constitutes a serious inconvenience. A known proposition for solving this problem consists in utilizing two-pointer indicating instruments wherein one pointer is adapted to make one turn within the speed area or dial segment corresponding to the velocities at which the engine is normally run. Although this specific arrangement improves the reading and makes it more accurate, unfortunately the instrument precision is outstepped by the reading precision. In spite of the many improvements and cares brought in the manufacture of these instruments, the gaging errors that may be encountered are of the order of magnitude of the maximum variations permissible under current use conditions for each type of turbo-jet engine.

The same inconveniences, that is, the overstepping of the instrument precision by the measuring precision, are also found in the measurement of many or any magnitudes, for example that of gas or liquid outputs or velocities, as well as in the measurement of magnitudes to be used in integration, synchronisation, counting and other purposes.

Now it is the essential object of the present invention to avoid the subservience to drawbacks of the general character set forth hereinabove. To this end, this invention is concerned with an improved method of effecting the high-sensitivity electric measurement of a magnitude adapted to be converted into a frequency or a frequency of electric, magnetic, electro-magnetic, or photo-electric pulses through any known and suitable process, whereby the magnitude to be measured is translated into electric pulses of a frequency proportional to the value of this magnitude, the frequency of secondary reference electric pulses emitted at a fixed frequency being subtracted from said proportional frequency, the resultant alternating current being fed to a synchronous electromotor coupled to the high-sensitivity measuring instrument, the frequency of said resultant alternating current being equal to the difference between said proportional and reference frequencies.

The present invention is also concerned with an electric high-sensitivity measuring device for carrying out the method broadly set forth hereinabove, which comprises means for generating electric pulses at a frequency proportional to the value of the magnitude to be measured, means for generating electric pulses at a fixed reference frequency or time-base frequency, other means for mixing and subtracting said measure frequency and reference frequency, and a synchronous electromotor coupled to a high-sensitivity measuring device and fed with the alternating-current output from said mixing-subtracting means, the frequency of said A.-C. output being equal to the difference between said measure and reference frequencies.

The high-sensitivity measuring device specified hereinabove may be used separately, that is, independently of a conventional-sensitivity measuring device.

This high-sensitivity measuring device may be associated with a normal-sensitivity measuring device coupled to another synchronous electromotor fed directly with the alternating current collected at the output of said electric pulse generator.

One of the specific advantages of this last-mentioned arrangement is to allow the feeding of the tachometer motors of a double-sensitivity velocity indicator from a single alternator and a single tachometer drive.

It is another object of this invention to permit the use of a single time base for a plurality of devices for measuring several variable magnitudes to be synchronized and of same or different characters.

Other features and advantages of the present invention will appear as the following description proceeds with reference to the accompanying drawings forming part of this specification and illustrating diagrammatically by way of example the manner in which the invention may be carried out in the practice. In the drawings:

Figure 16 is a view on a larger scale showing the arrangement of the wheelwork driven by the synchronous motors illustrated in Fig. 15, certain parts being broken away for the sake of clarity;

Figure 17 is a view on a smaller scale showing the arrangement of the members for adjusting and securing the field closing plates of the wheelwork illustrated in Fig. 16;

For the sake of clarity the illustrated and described devices relate to the measurement of velocities of rotation, but such devices may be used without modifications for the measurement of any magnitude convertible into a frequency or a frequency of electric, magnetic, electromagnetic or photo-electric pulses through any known process, such as gas or liquid outputs or velocities.

Figure 2:
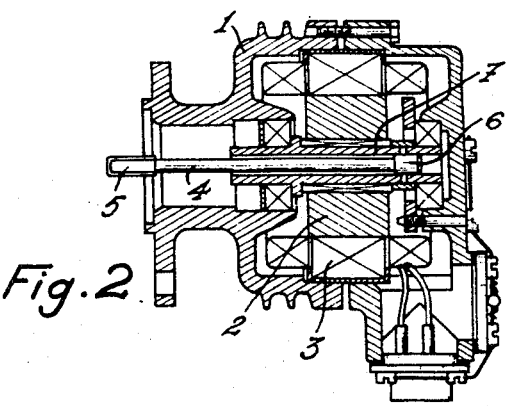
Figure 2 is an axial section showing the measuring alternator.

As a rule, the measurement of velocities of rotation through electric transmission means involves the use of an alternator 1 of which the field magnet 2 consists of a magnetized body having two pairs of poles, the armature 3 of this alternator comprising a three-phase winding (Fig. 2).

The alternator illustrated in Fig. 2 is driven through a tachometer drive shaft 4 having a square-sectioned driving end 5 and driving in turn through a cross-pin coupling head 6 the tubular shaft 7 of the field magnet 2.

Figure 3:
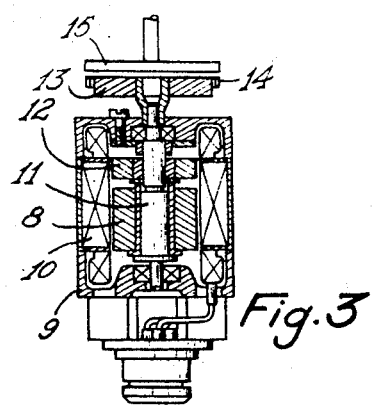
Figure 3 is an axial section showing the synchronous motor usable as a tachometer and which is fed by the alternator illustrated in Fig. 2.

The current output of this alternator is fed to a synchronous electromotor 9 having a three-phase winding 10 (Fig. 3). The rotating field developed by the field winding is effective on an armature 8 consisting of a magnet having one or two pairs of poles of high characteristics and stability.

The shaft 11 of the synchronous motor carries a complementary magnetized disc 12 acting as an anti-stall device mounted for loose rotation on the shaft 11. This shaft 11 has rigidly secured thereon, outside the motor case, a disc-shaped measuring magnet 13 with or without temperature adjustment shunts 14, this disc with high magnetic characteristics and stability pivoting in front of a nonmagnetic conductive plate 15 adapted to drive an index pointer directly or indirectly through the action of eddy currents. When the magnet rotates, the direction of the magnetic field is reversed several times per revolution at each point of the space, and the aforesaid plate is subjected to a torque proportional to the velocity of rotation of the magnet 13. This torque is counteracted in the normal manner by a spring which tends to prevent the plate from rotating, whereby the angle corresponding to the position of equilibrium is also proportional to the velocity to be measured.

When the current fed to the synchronous motor 9 is no more a three-phase current supplied directly from the alternator but another current of which the frequency is the result of a subtraction between the variable frequency of the pulses transmitted directly or indirectly from an alternator and the fixed reference frequency of pulses transmitted from a controlled pulse generator, it is thus possible to considerably decrease the magnitude of the instrumental errors.

To simplify the disclosure, the velocity of rotation of the measuring motor shaft 11 may be considered as being the difference between a velocity proportional to the speed to be measured and a fictitious velocity corresponding to the reference frequency. Under these conditions, if $n$ is the velocity to be measured, $n'$ the velocity of the indicating motor and $n'_0$ the fictitious reference velocity, we have:

$$n' = Kn - n'_0, \text{ with } Kn > n'_0$$

wherein K is a proportionality factor depending on the ratio of the tachometer drive and on the number of pulses per revolution of this drive.

In a conventional arrangement comprising an alternator and a synchronous motor, the velocities (or frequencies) of the tachometer drive, alternator and motor remain proportional to one another and also to the velocity to be measured. In this case, it is possible to write:

$$n' = Kn$$

and in this equality K is dependent on the ratio of the tachometer drive and on the respective numbers of poles of the alternator and motor.

The magnetic measuring device measures the velocity $n'$ corresponding to a velocity $n$ to be indicated. It may make an absolute error $\Delta n'$ giving an error $\Delta n$ on the speed indicated.

The relative error of the magnetic measurement is $$\frac{\Delta n'}{n'}$$

The relative error of the indication is $$\frac{\Delta n}{n}$$

The following equality: $\log.n' = \log.K + \log.n$ may be written, giving the differential coefficient $$\frac{\Delta n'}{n'} = \frac{\Delta n}{n}$$

The relative error of the indicator, $$\frac{\Delta n}{n}$$

is equal to that of the measuring device, that is $$\frac{\Delta n'}{n'}$$

In the case of a high-sensitivity tachometer having an equation:

$$n' = Kn - n'_0$$

we have: $\log.n' = \log.(Kn - n'_0)$, giving the differential coefficient:

$$\frac{\Delta n'}{n'} = \frac{K \Delta n}{Kn - n'_0} = \frac{\Delta n}{n} \cdot \frac{Kn}{Kn - n'_0}$$

or $$\frac{\Delta n}{n} = \frac{\Delta n'}{n'} \cdot \frac{Kn - n'_0}{Kn}$$

In this case, it will be seen that the relative error of the indication is only the fraction $$\frac{Kn - n'_0}{Kn}$$

of the magnetic measure error.

It will be noted that in the above calculus, the quantity $n'_0$ is considered as an invariant, which is only justified if the accuracy of the reference frequency is sufficiently high.

The parameters K and $n'_0$ may advantageously be selected according to the following indications, for example when the velocity to be measured varies between 7,500 and 8,500 r.p.m.

In order to take the best possible advantage from the magnetic system, it is well to select as the maximum velocity of rotation of the motor 9 the value of 4,000 r.p.m. Similarly, in view of avoiding the inconveniences characterizing a low-velocity magnetic system, the minimum useful velocity of the engine, which corresponds to the reading of the speed of 7,500 r.p.m., is selected to be 1,000 r.p.m. Consequently, the following two equations may be set:

$$4,000 = K.7,500 - n'_0$$
$$1,000 = K.8,500 - n'_0$$

from the solution of these equations we infer that $K = 3$ and $$n'_0 = 21,500 \ (358\tfrac{1}{3} \text{ r.p.s.})$$

As the tachometer drive ratio is 1:2, the pulse generator, in this case the alternator 1, must provide six cycles per revolution of the drive.

It will be readily understood that at 7,500 r.p.m., the pulse frequency of the generator is 375 cycles per second, whereas at 8,500 r.p.m. this frequency will be 425 cycles per second.

As the reference frequency is 358⅓ cycles per second, the following differential values will be obtained by subtraction:

$$375 - 358\tfrac{1}{3} = 16\tfrac{2}{3} \text{ c.p.s.}$$
$$425 - 358\tfrac{1}{3} = 66\tfrac{2}{3} \text{ c.p.s.}$$

Thus, a two-pole synchronous motor like the motor 9, fed with the above-indicated differential frequency, will rotate at speeds varying between $$16\tfrac{2}{3} \cdot 60 = 1{,}000 \text{ r.p.m.}$$

and $$66\tfrac{2}{3} \cdot 60 = 4{,}000 \text{ r.p.m.}$$

It is advantageous in the transmitter arrangement to use a convention-type alternator, that is, a three-phase, four-pole alternator.

Figure 5:
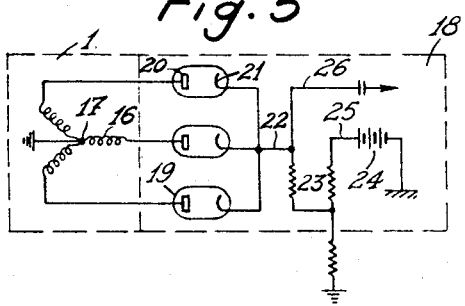
Figure 5 is a wiring diagram showing a rectifier for converting three-phase alternating current into single-phase wavy current.

In a first embodiment of the invention illustrated in the attached drawings (Fig. 5) the three-phase winding 16 of the alternator is Y-connected and has its central terminal 17 earthed. The free or outer ends of the coils are connected to a rectifying assembly 18 comprising three rectifying valves. These rectifying valves may consist of crystal diodes for examples germanium crystals or preferably vacuum electron diodes 19 for reasons of stability in their operation, moderate sensitivity to temperature variations and safety regarding possible voltage variations. In this case, the anodes 20 of the diodes 19 are connected separately to the free ends of the coils 16 and the cathodes 21 are connected in parallel to a common conductor 22. A constant direct voltage taken from a suitable source 24 is fed through a conductor 25 and a set of resistors 23 to the conductor 26. The conductor 26 branched off the conductor 22 is the seat of a wavy current which cannot appear unless the rectified voltages are higher than the counter-voltage fed through the conductor 25. These rectified voltages become higher than this limit when the alternator rotates at a sufficiently high speed.

Under these conditions it will be seen that the three-phase, four-pole alternator associated with the three rectifying cells will deliver a wavy current of six cycles per revolution. Moreover, with the provision of a counter-voltage it is possible to avoid the reverse rotation of the measuring motor 9 at high speed when the velocity to be measured is such that the pulse-frequency resulting from the wavy current circulating in the conductor 26 is considerably lower than the reference frequency.

This arrangement is simple and safe but requires the earthing of the neutral point of the alternator winding, whereas it is conventional practice to earth one phase of the alternator.

Figure 6:
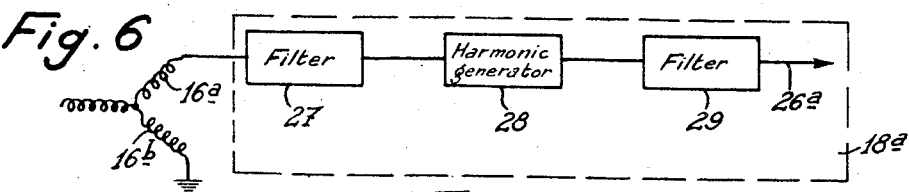
Figure 6 shows a modified arrangement of a single-phase wavy current generator.

As exemplified in Fig. 6, it is possible to take as a source of wavy current a single alternator coil 16a connected to a rectifying assembly 18a the other coil 16b being earthed. To the single-phase voltage created by the coil 16a a filtering action is applied in a filter 27 through which only frequencies higher than a predetermined value are allowed. In the practical example considered herein, the limit is 125 cycles per second, which corresponds to a velocity of rotation of 7,500 r.p.m. of the shaft of which the speed is to be measured. To this filter a harmonic generator 28 giving the third harmonic is associated; this generator is followed by another filter 29 adapted to allow only frequencies comprised between two limits therethrough. In the practical example considered herein, these limits are 375 and 425 c.p.s. Said filter 29 feeds the conductor 26a with a wavy current.

Whatever the way in which the alternator-rectifer combination operates, a wavy current is collected of which the wave frenquency is a multiple of the number measuring the actual velocity of rotation to be measured.

Figure 7:
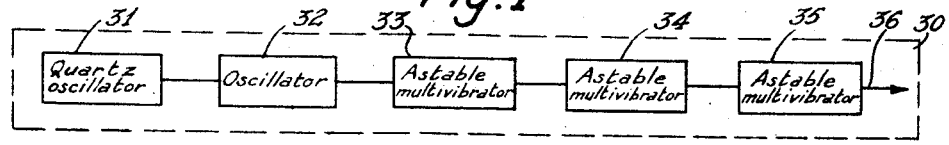
Figure 7 is a diagram showing the relative arrangement of the elements of the reference-frequency generator.

The 358⅓ c.p.s. reference frequency is obtained from a reference pulses transmitter 30 diagrammatically-illustrated in Fig. 7 and comprising quartz oscillator 31 followed by a number of frequency-dividing elements of the multivibrator type. The quartz frequency is preferably not too high to avoid either the use of an excessively high number of multivibrators, or too high or too low division ratios, as thus would render the quartz too bulky and fragile. To obtain an adequate safety of operation, the selection of the necessary multivibrators is limited to those having a maximum division ratio of 5.

Under these conditions the quartz oscillator 31 is set at 21,500 c.p.s. and feeds the control circuit of an oscillator 32. This oscillator 32 is connected to an astable multivibrator 33 acting as a divider by four and synchronized at 5,375 c.p.s. The astable multivibrator 33 feeds another astable multivibrator 34 synchronized at 1,075 c.p.s. and acting as a divider by five. An output astable multivibrator 35 synchronized at 358⅓ c.p.s. acts as a divider by three. Said astable multivibrator 35 feeds an outlet conductor 36.

It will be noted that the selection of these elements is adapted in a successful way as a function of loads, the quartz being simply protected against external agents without being subjected to a thermostatic adjustment of which the stabilization time would exceed by too great a margin the normal time elapsing between the starting and the actual use of the apparatus. With a temperature coefficient lower than $4.10^{-6}$, corresponding to a frequency variation of $2/10{,}000$, the permissible temperature variation is 50° C. The quarts is calibrated to $1/10{,}000$ and the practical conditions in which the calibration is effected are selected as a function of the heating observed within the apparatus in view of spreading the frequency variations resulting from extreme surrounding temperatures, that is about $-20°$ C. and $+40°$ C.

Figure 8:
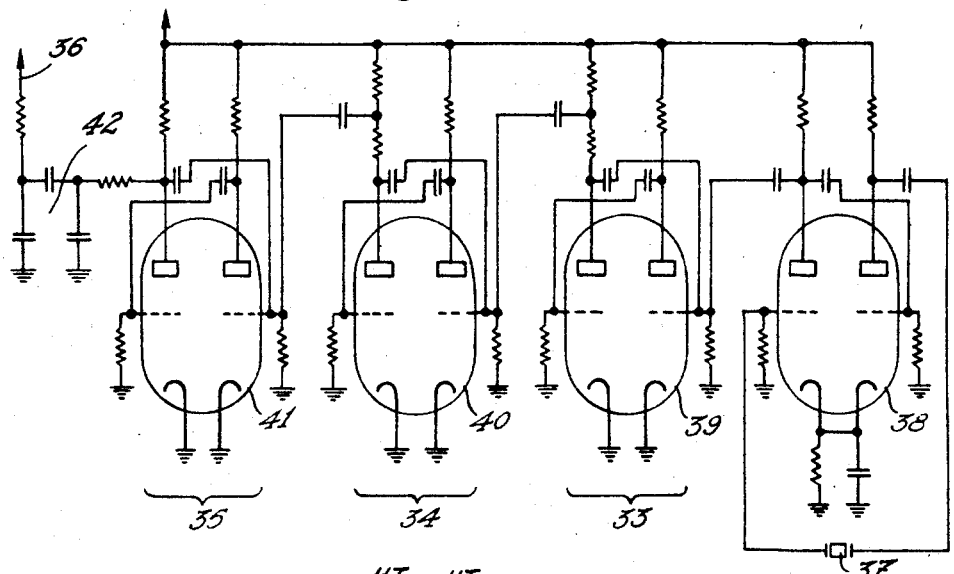
Figure 8 is the electrical diagram of a reference-frequency generator of the kind illustrated in Fig. 7.

In the embodiment illustrated in Fig. 8, the quartz 37 is mounted between the first plate and the second grid of a double triode 38 which simultaneously operates as quartz oscillator 31 and as synchronized oscillator 32. Said double triode 38 is connected to the astable multivibrator 33 provided with a double triode 39, which multivibrator feeds the astable multivibrator 34 provided with a double triode 40, which multivibrator 34 feeds in turn the outlet astable multivibrator 35 provided with a double triode 41. Said astable multivibrator 35 is connected to the outlet conductor 36 by means of a waveform conversion element 42.

It is advantageous to obtain a differential frequency representing the difference between the pulse frequency supplied by the alternator 1 and the rectifying assembly 18 or 18a described hereinabove and the reference frequency supplied by the pulse emitter 30 mentioned hereinabove. To this end, a frequency-subtracting device is provided which operates by beat between the pulse frequency and the reference frequency, these two frequencies being fed simultaneously to a same electron tube. It is advantageous to so select the biasing conditions of this tube as to ensure a beat-detection therein, a low-pass or tuned filter separating the beat frequency from the incident frequencies. This type of mounting is well known and therefore it is not deemed necessary to further describe it in connection with the arrangement of this invention.

Since the electromotor 9 necessitates a three-phase current supply it is advantageous to produce the beating of the pulse frequency with the three phases of a three-phase system adjusted according to the reference frequency. Thus, a three-phase beat will be obtained.

Figure 9:
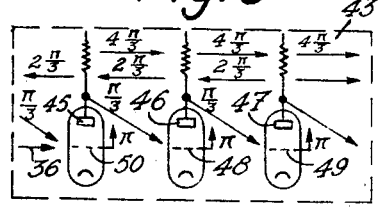
Figure 9 shows very diagrammatically the arrangement of a three-phase oscillator.
Figure 10:
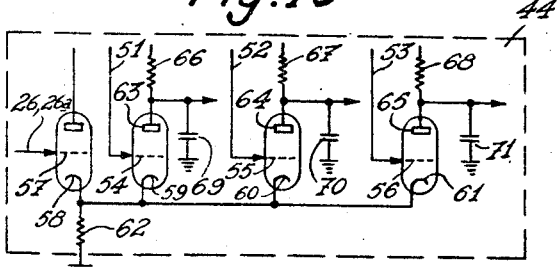
Figure 10 shows also very diagrammatically the arrangement of the various component elements of the differential system.

Under these conditions, the differential frequency transmitter will comprise, on the one hand, a three-phase oscillator 43 synchronized by the reference frequency and illustrated diagrammatically in Fig. 9 and, on the other hand, a three-phase differential system 44 of which each element is supplied simultaneously with one phase of the preceding oscillator and with the pulse frequency, this differential system being illustrated diagrammatically in Fig. 10.

The three-phase oscillator 43 (Fig. 9) comprises three triodes having their plates or anodes 45, 46, 47 connected to the grids 48, 49, 50 respectively of the subsequent triodes. The reference frequency is fed through the conductor 36 to the grid 50. Each grid-plate connection comprises a capacitor-resistor unit adapted to produce a phase-shift $\pi/3$ between the grid of a tube and the plate of the preceding tube. As each triode introduces a phase shift $\pi$ (opposition), the phase shift between two homologous elements of any two adjacent triodes is $4\pi/3$, thereby giving an apparent phase shift of $2\pi/3$. The phase shift $\pi/3$ by capacitors and resistors is adapted to the frequency of 358⅓ c.p.s. or to a frequency slightly lower to facilitate the synchronization of the three-phase oscillator by the single-phase reference frequency fed to any one of these triodes.

The plate 45, 46, 47 deliver through their conductors and load resistors a three-phase current and each phase of this current is fed through conductors 51, 52, 53 to a four-triode differential system 44 (Fig. 10). Three of the triodes of this system have their grids 54, 55, 56 connected to the conductors 51, 52, 53 respectively. A fourth triode receives through its grid 57 the current from the conductor 26 or 26a connected to the measuring frequency, that is, the current delivered from the rectifying assembly 18 or 18a. This connection is provided by a suitable resistor and capacitor assembly. The cathode 58 of the aforesaid triode is connected to the cathodes 59, 60, 61 of the three other triodes, the assembly of said cathodes being earthed through a resistor 62. Thus, a common cathode load is created. The cathode resistor 62 and the tube consumption are so calculated that the other three beat triodes act as a means for detecting the grid-cathode voltage. Each anode 63, 64, 65 of the beat triodes is connected to a corresponding load resistance 66, 67, 68 and earth-decoupled through an also corresponding capacitor 69, 70, 71, this capacitor-resistor assembly constituting a first means for filtering the incoming signals.

Figure 11:
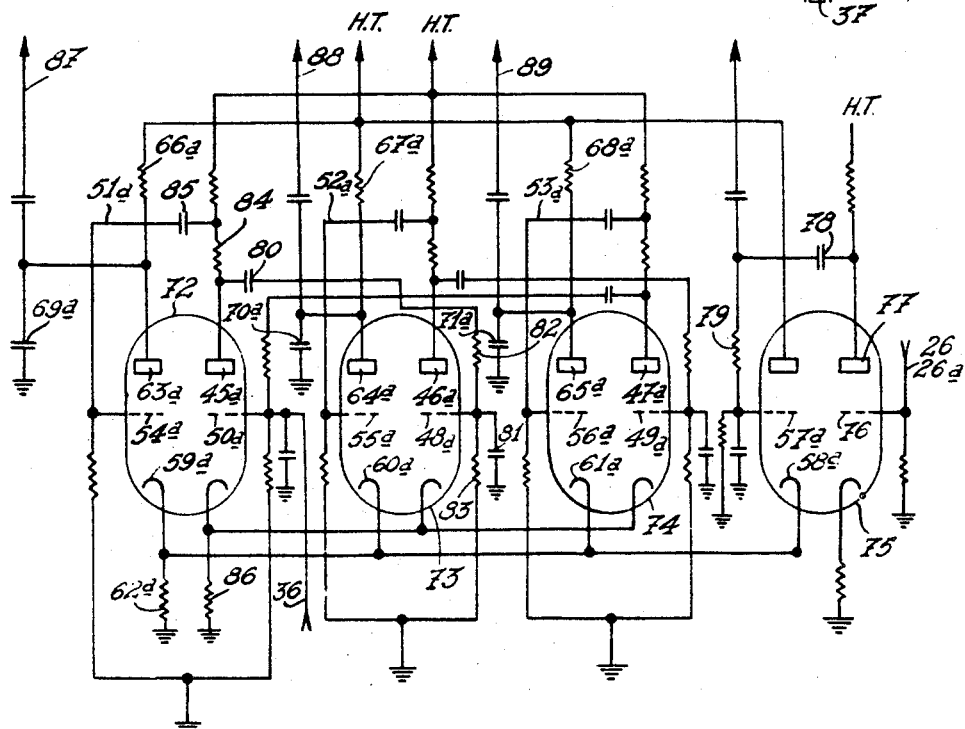
Figure 11 is the electrical diagram of a combined three-phase oscillator and differential system respectively of the kinds illustrated in Figs. 9 and 10.

In the embodiment illustrated in Fig. 11, wherein the elements similar to those of Figs. 9 and 10 have the same reference numerals followed by index $a$, there are three double triodes, 72, 73, 74 acting simultaneously as oscillators through their inlet triode stages and as mixers through their outlet triode stages. A fourth double triode 75 is provided with an inlet triode stage acting as an amplifier and waveform conversion device, its grid 76 being connected to the conductor 26 or 26a fed by the rectifier 18 or 18a (Figs. 5 and 6) and its plate 77 being connected to the grid 57a of its outlet triode stage through a condenser 78 and a resistor 79. The grid-plate connection between the oscillator stages of two successive double triodes 72 to 74 comprises a capacitor 80, 81-resistor 82, 83 assembly adapted to produce a phase-shift. Each plate 45a to 47a of the oscillator stage of a double triode 72 to 74 is connected through its load resistor 84 to a capacitor 85 mounted in the conductor 51a to 53a connected in turn to the grid 54a to 56a of its mixer stage. The three cathodes of the oscillator stages are interconnected and earthed through a resistor 86 in order to obtain a common cathode load.

The anode currents at 63a, 64a, 65a are fed, beyond the decoupling capacitors 69a, 70a, 71a and by means of three conductors 87, 88, 89, to the cells of a three-phase preamplifier, then, by means of phase-shifting cathode-follower mountings, to a three-phase power amplifier of the symmetrical type.

Figure 12:
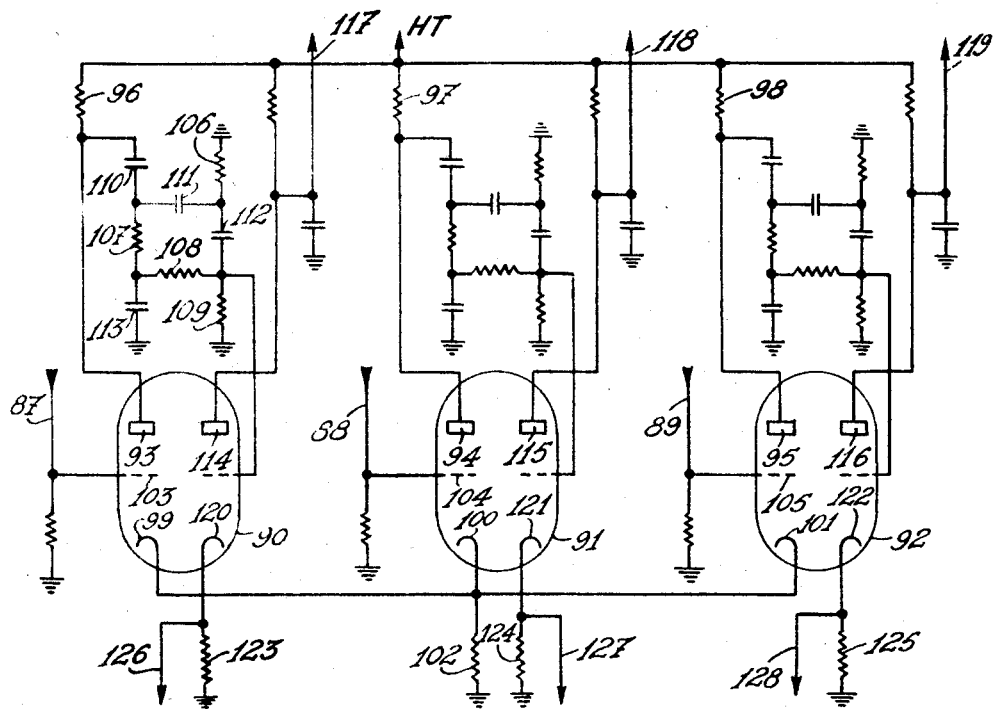
Figure 12 is the electrical diagram of a three-phase pre-amplifier equipped with cathode-follower stages and adapted to be connected to the differential system.

In the embodiment shown in Fig. 12, the preamplifier and the phase-shifting cathode-follower mountings comprise three double triodes 90, 91, 92 the triode stages of which respectively act as preamplifier elements and as cathode-followers. The plates 93, 94, 95 of the three preamplifier stages are connected to ohmic load resistors 96, 97, 98. Their three cathodes 99, 100, 101 are interconnected for facilitating the decoupling of the cathode resistance 102, the sum of the three phase currents remaining constant. Their three grids 103, 104, 105 are respectively connected to the conductors 87, 88, 89. The connection between each preamplifier stage and the corresponding cathode-follower stage is effected with the assistance of a resistor 106, 107, 108, 109-capacitor 110, 111, 112, 113 filter of the double-T type, thereby eliminating the detection residues from the differential system. The plates 114, 115, 116 of said cathode-follower stages feed three direct outlet conductors 117, 118, 119, while their cathodes 120, 121, 122, associated to their load resistors 123, 124, 125 feed three phase-shifted outlet conductors 126, 127, 128.

Figure 13:
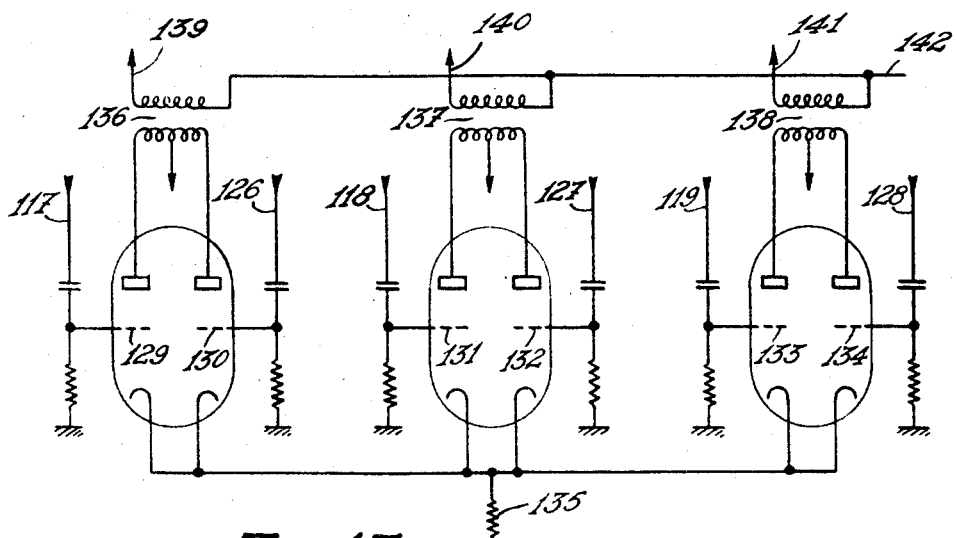
Figure 13 is the electrical diagram of a three-phase power amplifier interposed between the cathode-follower stages of the pre-amplifier and the measuring synchronous motor.
Figure 15:
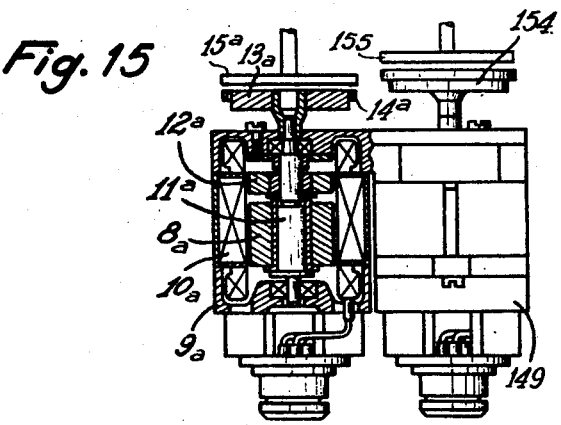
Figure 15 is a part-elevational, part-sectional view showing the synchronous motors usable as tachometers and which are simultaneously fed by the alternator illustrated in Fig. 1.
Figure 18:
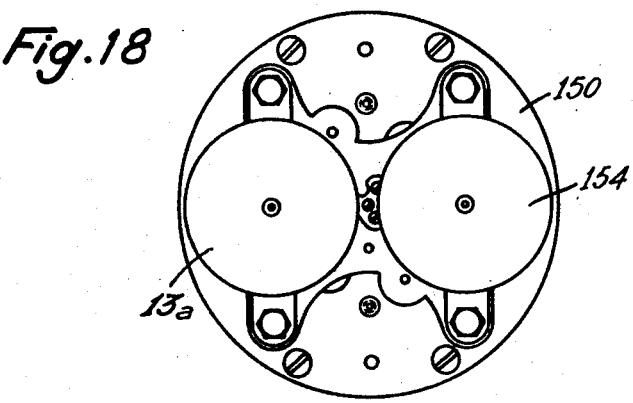
Figure 18 is a bottom view on a smaller scale of the device illustrated in Figs. 15 and 16.

The three-phase power amplifier of the symmetrical type comprises, as illustrated in Fig. 13, three double triodes the grids of which 129 to 134 are respectively connected to the conductors 117, 126, 118, 127, 119 and 128. Their six cathodes are interconnected in order to facilitate the decoupling of the cathode resistance 135. Said double triodes are charged by transformers 136, 137, 138 tuned on the maximum frequency of 66⅓ c.p.s. as a function of the impedance of the synchronous motor 9 and at the cost of a slight loss of efficiency at lower frequencies. Each primary winding of said transformer is connected at its middle point to the high tension. Their secondary windings are connected at one of their ends to three lines 139, 140, 141 forming the three-phase circuit feeding the synchronous motor or tachometer motor. The other ends of said secondary windings are interconnected and connected to the neutral line 142.

The feeding of the electron assembly is provided either by means of alternating current for high tension and heating or by means of alternating current for high tension and direct current for heating.

Figure 1:
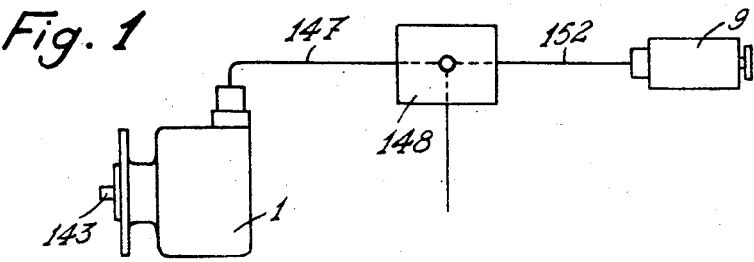
Figure 1 is a diagram showing the general arrangement of a high-sensitivity measuring device according to the invention.
Figure 4:
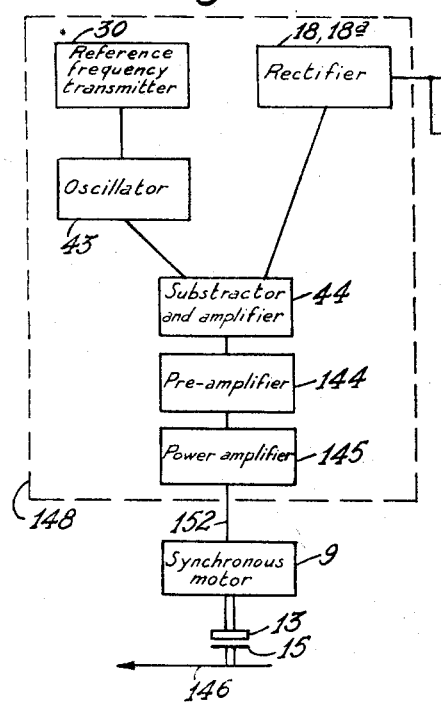
Figure 4 is a diagram showing the relative arrangement of the transformation elements interposed between the alternator and the measuring synchronous motor.

As illustrated in Fig. 4, under these conditions and in the case considered specifically herein the assembly comprises an alternator 1 rotating at half the speed of shaft 143, the latter rotating at the velocity to be measured which ranges between 7,500 and 8,500 r.p.m., as already set forth. This alternator 1 is electrically connected to a voltage rectifier 18 or 18a supplying a single-phase, rectified-voltage wavy current of a frequency varying between 375 and 425 c.p.s., which is also called the pulse frequency (this arrangement having been described hereinabove with reference to Figs. 5 and 6). The rectifier 18 or 18a is in parallel with a reference frequency transmitter 30 emitting a single-phase alternating current at the reference frequency of 358⅓ c.p.s. (this arrangement having been described with reference to Figs. 7 and 8), and this reference frequency is utilized to synchronize a three-phase oscillator 43 supplying a three-phase current at this reference frequency (arrangement of Figs. 9 and 11). The rectifier 18 or 18a and oscillator 43 (see Figs. 10 and 11) are connected to a three-phase subtractor and amplifier 44 supplying in turn current through a preamplifier 144 with cathode-follower stages (Fig. 12) and a power amplifier 145 (Fig. 13) to the rotary-field motor 9. This motor drives the measuring magnet 13 in front of which is pivotally mounted the eddy-current disc 15 coupled to the pointer 146. The alternator 1 is connected through a single line 147 to a case 148 containing the complete aforesaid apparatus 18 or 18a, 30, 43, 44, 144 and 145 (Fig. 1). The proper electric currents are fed through a single or multiple conductor to this case 148.

Figure 14:
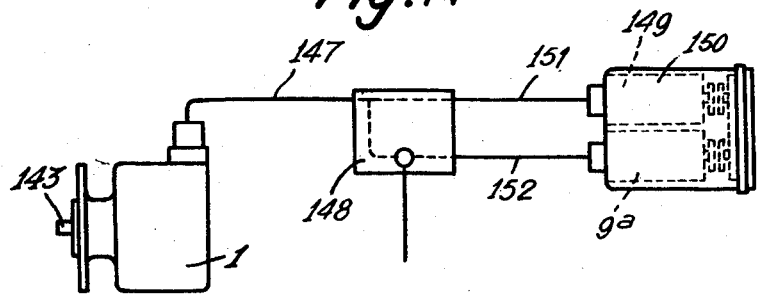
Figure 14 is a diagram showing the arrangement of a double-sensitivity measuring assembly comprising a high-sensitivity measuring device and a conventional measuring device both fed by a single alternator.

As already mentioned it is possible from a single alternator to directly feed a conventional-type tachometer motor 149 (Figs. 14 to 18) as well as a high-sensitivity tachometer motor 9a of the type hereinabove described, by using the set of apparatus described hereinabove, both motors 9a and 149 being housed in a common case 150. The motor 149 is fed from alternator 1 through a direct line 151 and the line 152 feeding the motor 9a is associated with the pulse transmitter and, with the necessary apparatus contained in the case 148 (Fig. 14). Thus, an apparatus of this type, fitted on the instrument panel, will indicate by means of a low-sensitivity pointer any values of velocities of rotation ranging from 0 to 8,500 r.p.m. The other pointer remains concealed by a mask 153 (Fig. 16) until the speed to be measured attains 7,500 r.p.m. so as to provide a very accurate indication of the velocity attained in the range from 7,500 to 8,500 r.p.m.

In the double indicator contained in the common case 150 (Fig. 18) the measuring magnets 13a and 154 are shifted along the motor axes to avoid any magnetic interactions. The non-magnetic discs 15a and 155 (Fig. 16) corresponding to the magnets 13a and 154 are carried by parallel shafts 156, 157. The magnetic circuits are closed by adjustable field-closing plates 158 and 159. Like the magnets, these discs 15a, 155 are disposed in different planes. Each field-closing plate is supported endwise of a column above an intermediate plate 160, on the one hand, by a screw 161 with the interposition of a flexible washer 162 and, on the other hand, by a spring 163 inserted in an aperture provided to this end in the opposite column 164, the screw 165 serving as an adjustment member by compressing or releasing the spring 163 (Fig. 17).

The shaft 156 is wedged by means of a collar on a return spiral spring 166 mounted between two stationary plates 167, 168 (Fig. 16). With this arrangement any disturbances likely to be caused by vibration are avoided both for pointer oscillation and for vibration deriving from other sources, while avoiding the shifting of the average position. The shaft 156 carries on the other hand a toothed wheel 169 meshing with a cannon pinion 170. The center shaft 171 of the apparatus which is rigid with a wheel 172 identical with the aforesaid pinion 170 passes through said pinion. This wheel 172 meshes with a wheel 173 rigid with the shaft 157. This shaft 157 also carries a spiral spring 174 positioned between a pair of stationary plates 175, 176. Each wheel 170, 172 carries a stop pin 177, 178 adapted to engage a fixed stop 179, 180. Thus, the indications of the double apparatus are given by two concentrical pointers of which the one 181 associated with the mask 153 is secured on the cannon portion of wheel 170 to indicate the measure of speeds with a high sensitivity and the other 182 is wedged on the center shaft 171 to indicate speed values with less sensitivity but through the speed range.

Figure 19:
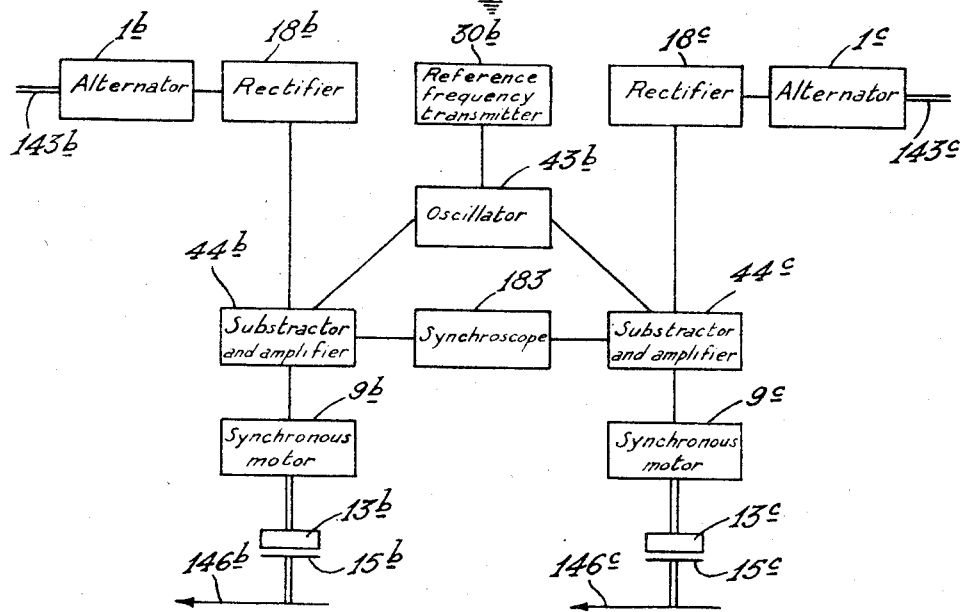
Figure 19 is another diagram showing the relative arrangement of the conversion members for synchronizing the velocities of two aircraft-mounted turbo-jet engines.

If it is desired to synchronize the velocities of several turbo-jet engines equipping a same aircraft, the assembly illustrated in Fig. 19 may be used; this example refers to the case of a twin-engined aircraft.

This mounting comprises a time base consisting of a transmitter 30b of a reference frequency supplying a single-phase alternating current, this reference frequency being adapted to synchronize a three-phase oscillator 43b supplying in turn a three-phase current at this reference frequency. The transmitter and oscillator are designated by the same reference numerals as in Fig. 4 followed by index b, their description having already been made hereinabove with reference to Figs. 7 and 9.

On the other hand, each turbo-jet engine shaft 143b or 143c is drivingly connected to an alternator 1b or 1c rotating at a predetermined fraction of the velocity of the corresponding shaft 143b or 143c. Each alternator is eletrically connected to a voltage rectifier 18b or 18c of the type described with reference to Figs. 5 and 6, to supply a single-phase wavy current of a frequency variable and proportional to the velocity of the relative shaft 143b or 143c. Each rectifier 18b or 18c and the three-phase oscillator 43b are connected to a three-phase subtractor and amplifier 44b or 44c designed substantially as already described hereinabove with reference to Fig. 10. This three-phase amplifier 44b or 44c is adapted to feed through a power amplifier the corresponding rotary-field tachometer motor 9b or 9c. This motor drives the corresponding measuring magnet 13b or 13c in front of which the eddy-current disc 15b or 15c coupled to the pointer 146b or 146c is pivotally mounted. A synchroscope 183 connected to the three-phase subtractors and amplifiers 44b and 44c permits of determining the degree of synchronism attained between the two turbo-jet engines.

If the frequencies employed are the same as those of the device described hereinabove with reference to Figs. 1 to 13 of the drawings, the sensitivity of this twin-engine control arrangement is increased in comparison with known arrangements since one revolution of this synchroscope 183 corresponds to a ⅛ of revolution variation between the tachometer drives of the two turbo-jet engines.

Moreover, it will be readily understood that many modifications may be brought to the embodiments shown and described herein, without departing from the scope of the invention as set forth in the appended claims. Thus, more particularly, by properly selecting different frequencies it would be possible to affect to high-sensitivity measurements an area or dial segment disposed in the middle or at the beginning of a given scale, this area or dial segment being of course more spread or on the contrary narrower than the one cited by way of example in the above description.

What I claim is:

1. A device for effecting in a predetermined range the high-sensitivity measurement of a variable magnitude adapted to be converted into a frequency or a sequence of electric, magnetic, electro-magnetic and photo-electric pulses, comprising, in combination, means for translating the magnitude to be measured into a monophase wavy current, the electric pulses of which have a measure frequency proportional to the value of said magnitude, a reference frequency generator, the frequency of which is distinct from, and outside of, the measure frequencies corresponding to the limits of the measurement range, three-phase electric pulse generating means connected to said generator and the frequency of which is adjusted according to said reference frequency, three-phase means connected to said translating and generating means for successively beating the monophase measure frequency with the frequencies of the three-phase pulses in order to obtain a three-phase current, the frequency of which is equal to the difference between these measure and reference frequencies, means for preventing said monophase current from being fed to said three-phase beating means as long as the measure frequency is lower than the lower limit of the measuring range; and a high-sensitivity measuring device having a three-phase synchronous motor connected to, and fed by, said beating means with said three-phase current.

2. A device according to claim 1 further comprising means interposed between the translating means and the three-phase beating means and adapted to multiply the frequency of the monophase current.

3. A device according to claim 1, wherein the translating means comprises a multi-phase alternator driven at a rotational speed proportional to the value of the magnitude to be measured, and a means fed by said multi-phase alternator for supplying a monophase wavy current representative of the superposed currents developed by said multi-phase alternator in its phases and the frequency of which is the measure frequency.

4. Device according to claim 1, wherein the means for preventing the monophase current to be fed to the three-phase beating means comprises a source of continuous current having a fixed voltage and means for subtracting said fixed continuous voltage from that of the monophase current in order to prevent the monophase current from appearing until its voltage is greater than a predetermined limit.

5. A device for simultaneously effecting the conventional measurement and in a predetermined range the high-sensitivity measurement of a variable magnitude adapted to be converted into a frequency or a sequence of electric, magnetic, electro-magnetic and photo-electric pulses, comprising, in combination, a multi-phase alternator driven at a rotational speed proportional to the value of the magnitude to be measured, a means fed by said multi-phase alternator for supplying a monophase wavy current representative of the superposed currents developed by said multi-phase alternator in its phases and the frequency of which is the measure frequency, a conventional measuring device having a multi-phase synchronous motor fed by said multi-phase alternator, a reference frequency generator, the frequency of which is distinct from, and outside of, the measure frequencies corresponding to the limits of the high sensitivity measurement range, a three-phase electric pulse generating means connected to said generator and the frequency of which is adjusted according to said reference frequency, three-phase means connected to said supplying and generating means for successively beating the monophase measure frequency with the frequencies of the three-phase pulses in order to obtain a three-phase current, the frequency of which is equal to the difference between these measure and reference frequencies, means for preventing said monophase current to be fed to said three-phase beating means as long as the measure frequency is lower than the lower limit of the high sensitivity measuring range, and a high-sensitivity measuring device having a three-phase synchronous motor connected to, and fed by, said beating means with said three-phase current.

6. An electric high-sensitivity device for measuring in a predetermined range a variable magnitude adapted to be converted into a frequency or a sequence of electric, magnetic, electro-magnetic and photo-electric pulses, such as velocities of rotation, comprising, in combination, means sensitive to the magnitude to be measured for translating said magnitude into a three-phase alternating current, a transmitter connected to said translating means and adapted to deliver monophase electric pulses at a frequency proportional to the value of said magnitude, a time base adapted to deliver three-phase electric pulses at a fixed reference frequency distinct from, and outside of, the measure frequencies corresponding to the limits of the measurement range, a three-phase mixer-subtractor of the measure frequency and of the reference frequency interconnecting said transmitter and said time base and delivering a three-phase alternating current, the frequency of which is equal to the difference between the aforesaid measure and reference frequencies, means for preventing said monophase electric pulses to be fed to said mixer-subtractor as long as the proportional frequency is lower than a predetermined limit, a three-phase synchronous motor fed with the three-phase alternating current from said mixer-subtractor, and a high sensitivity measuring device operatively connected to said three-phase synchronous motor.

7. A device according to claim 6, wherein the transmitter comprises a rectifier adapted to rectify the alternating current in order to yield a current supplied by the translating means comprising a continuous component and a wave.

8. A device according to claim 6 wherein the translating means consists of a three-phase alternator driven at a rotational speed proportional to the value of the magnitude to be measured and having Y-connected coils the common point of which is earthed, and wherein the transmitter and the means for preventing the alternating current to be fed to the mixer-substractor consist of a rectifying assembly comprising three diodes the grids of which are respectively connected to the coils of the three-phase alternator while the cathodes thereof have a common point, a source of direct current connected to said common point and of a voltage at least equal and opposed to the continuous component of the rectified current delivered by said diodes and of a value so selected that a wavy current does not appear until the velocity of rotation of the alternator exceeds a predetermined limit.

9. A device according to claim 6, wherein the translating means consists of a three phase alternator driven at a rotational speed proportional to the value of the magnitude to be measured, and wherein the transmitter consists of a rectifying assembly comprising a high-pass filter connected to only one coil of the alternator, another coil of said alternator being earthed, a generator of third harmonics fed by the single-phase current filtered by this high-pass filter and a band-pass filter fed by said generator.

10. A device according to claim 6 wherein the frequency mixer-substractor comprises a three-phase oscillator connected to the time base in order to be synchronized by the reference frequency, and a three-phase amplifier constituting a differential system of which each element is fed simultaneously from one phase of the three-phase oscillator and with the frequency from the measuring transmitter.

11. A device according to claim 10, wherein the three-phase oscillator comprises three triode elements disposed in loop circuit, a capacitor-resistor dephasing unit connecting the plate of triode to the grid of the following triode, one of the grid being connected to the outlet of the time base.

12. A device according to claim 10, wherein the three-phase amplifier constituting a differential system comprises three triodes the grids of which are connected to the three-phase oscillator, a fourth triode the grid of which is connected to the transmitter, the cathodes of said four triodes being interconnected with one another, leakage capacitors respectively connected to the anodes of the first three triodes to filter out the incoming signals, and means for biasing the four triodes so that the first three triodes are operative to detect the grid-cathode voltage.

13. A device according to claim 10, wherein the three-phase oscillator and the differential system comprise three double triodes having triode inlet oscillating and outlet mixing stages, respectively, the three triode oscillating stages being disposed in loop circuit, a capacitor-resistor dephasing unit connecting the plate of each triode oscillating stage to the grid of the following triode oscillating stage, one of the grids of the triode oscillating stages being connected to the outlet of the time base, the grids of the triode mixing stages being connected to the three-phase oscillator, a fourth double triode having an inlet triode amplifying stage acting as a waveform conversion element and the grid of which is connected to the transmitter while the outlet triode element has its grid connected to the anode of the inlet triode amplifying stage of said fourth double triode, the cathodes and anodes of the oscillating stages being respectively interconnected with one another while the cathodes and anodes of the mixing stages and those of the outlet stage of the fourth double triode are respectively interconnected with one another, leakage capacitors respectively connected to the anodes of the mixing stages to filter out the incoming signals, and means for biasing the mixing stages and the outlet stage of the fourth double triode so that said mixing stages are operative to detect the grid-cathode voltage.

14. A device according to claim 10, further comprising a three-phase preamplifier and a three-phase power amplifier of the symmetrical type serially inserted between the differential system and the synchronous motor, each stage of said preamplifier having a cathode-follower dephasing mounting connected to one of the stages of the power amplifier for feeding the same, and three transformers tuned on the maximum frequency as a function of the impedance of said synchronous motor for respectively charging the stages of said power amplifier.

15. A device according to claim 14, wherein the three-phase preamplifier comprises three double triodes having inlet preamplifying and outlet dephasing stages, the grid of each preamplifying stage being connected to one of the three outlets of the differential system while that of the dephasing stage pertaining to the same double triode is connected to the anode of said preamplifying stage through a resistor-capacitor filter of the double-T type, the six anodes being interconnected with one another as well as the three cathodes of the preamplifying stages, three direct outlet conductors respectively fed by the anodes of the dephasing stages, three resistors respectively inserted between earth and the cathodes of said dephasing stages, and three phase-shifted outlet conductors respectively fed by the cathodes of said dephasing stages, and wherein the power amplifier of the symmetrical type comprises three double triodes having three triode stages the grids of which are respectively connected to said direct outlet conductors while the grids of the three other triode stages are respectively connected to said phase shifted outlet conductors, the anodes of each double triode of said power amplifier being respectively connected to the ends of the primary winding of the corresponding transformer.

16. A device according to claim 6, wherein in the case of speed measurements, the synchronous motor is a tachometer and the measuring device comprises a measuring magnet driven by said tachometer, a non-magnetic disc driven by said magnet, a pivoting shaft, an index pointer carried by said shaft, and a wheelwork driven by said disc and connected to said shaft for controlling the same.

17. An electric double-sensitivity device for simultaneously effecting the conventional measurement and in a predetermined range the high-sensitivity measurement of a variable magnitude adapted to be converted into a frequency or a sequence of electric, magnetic, electro-magnetic and photo-electric pulses, such as velocities of rotation, comprising, in combination, means sensitive to the magnitude to be measured for translating said magnitude into an alternating current, a transmitter connected to said translating means and adapted to deliver electric pulses at a frequency proportional to the value of said magnitude, a time base adapted to deliver electric pulses at a fixed reference frequency distinct from, and outside of, the measure frequencies corresponding to the limits of the measurement range, a mixer-subtractor of the measure frequency and of the reference frequency interconnecting said transmitter and said time base, means for preventing said alternating current to be fed to said mixer-subtractor as long as the proportional frequency is lower than a predetermined limit, a synchronous motor fed with the alternating-current output from said mixer-subtractor, the frequency of this A.-C. output being equal to the difference between the aforesaid measure and reference frequencies, a high-sensitivity measuring device operatively connected to said synchronous motor, a second synchronous motor fed with the alternating current output from said translating means, and a conventional measuring device operatively connected to said second synchronous motor.

18. A device according to claim 17, wherein in the case of speed measurements, each synchronous motor is a tachometer and each measuring device comprises a measuring magnet driven by said tachometer, a non-magnetic disc driven by said magnet, measuring magnet and non-magnetic disc corresponding to each tachometer being disposed in different planes with respect to those corresponding to the other tachometer, a center shaft, a cannon wheel, two index pointers respectively carried by said shaft and wheel, and a wheelwork driven by said discs and connected to said shaft and said wheel for controlling the same.

19. A device for effecting in a predetermined range the simultaneous high-sensitivity measurements of a plurality of variable magnitudes respectively adapted to be converted into frequencies or sequences of electric, magnetic, electromagnetic and photo-electric pulses, comprising, in combination means for respectively translating the magnitudes to be measured into monophase wavy currents, the electric pulses of which have frequencies, measure frequencies, respectively proportional to the values of said magnitudes, a reference frequency generator, the frequency of which is distinct from, and outside of, the measure frequencies corresponding to the limits of the measurement range, three-phase electric pulse generating means connected to said generator and the frequency of which is adjusted according to said reference frequency, three-phase means respectively connected to said translating and generating means for successively beating each monophase measure frequency with the frequencies of the three-phase pulses in order to respectively obtain three-phase currents, the frequencies of which are respectively equal to the differences between these measure and reference frequencies, means for respectively preventing said monophase currents to be fed to said three-phase beating means as long as the measure frequencies are lower than the lower limit of the measuring range, and high-measuring devices relating to said magnitudes, respectively, and having three-phase synchronous motors respectively connected to, and fed by, said beating means with said three-phase currents, whereby said magnitudes may be synchronized.

20. An electric high-sensitivity assembly for measuring in a predetermined range a plurality of variable magnitudes respectively adapted to be converted into frequencies or sequences of electric, magnetic, electro-magnetic and photo-electric pulses, such as velocities of rotation of several turbo-jet engines, comprising, in combination, means respectively sensitive to the magnitudes to be measured for translating said magnitudes into three-phase alternating currents, transmitters respectively connected to said translating means and adapted to respectively deliver monophase electric pulses at frequencies proportional to the values of said magnitudes, a time base adapted to deliver three-phase electric pulses at a fixed reference frequency distinct from, and outside of, the measure frequencies corresponding to the limits of the measurement range, three-phase mixer-subtractors of the measure frequencies and of the reference frequency respectively interconnecting said transmitters and said time base, and respectively delivering three-phase currents, the frequencies of which are respectively equal to the differences between the measure frequencies and reference frequency, means for respectively preventing said monophase electric pulses to be fed to said mixer-subtractors as long as the measure frequencies are lower than the lower limit of the measuring range, synchronous motors respectively fed with the three-phase current outputs from said mixer-subtractors, high-sensitivity measuring devices operatively connected to said synchronous motors, respectively, and a synchroscope connected across the mixer-subtractors corresponding to at least two magnitudes.

References Cited in the file of this patent

UNITED STATES PATENTS

| 2,178,225 | Diehl | Oct. 31, 1939 |
| 2,408,451 | Sorenson | Oct. 1, 1946 |
| 2,429,427 | Rieber | Oct. 27, 1947 |
| 2,514,178 | Chilman | July 4, 1950 |
| 2,543,077 | Treseder | Feb. 27, 1951 |
| 2,551,306 | Wisman | May 1, 1951 |
| 2,686,294 | Hower | Aug. 10, 1954 |

FOREIGN PATENTS

| 706,298 | Great Britain | Mar. 24, 1954 |

OTHER REFERENCES

"Frequency Measurement Adapter," Richard Graham, Radio and Television News, August 1955, pages 44, 91 and 92.